(12) United States Patent
Mahadevan et al.

(10) Patent No.: US 9,847,931 B2
(45) Date of Patent: *Dec. 19, 2017

(54) PROCESSING OF MULTICAST TRAFFIC IN COMPUTER NETWORKS

(71) Applicant: DELL PRODUCTS L.P., Round Rock, TX (US)

(72) Inventors: Ramasubramani Mahadevan, Chennai (IN); Pathangi N. Janardhanan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/920,688

(22) Filed: Oct. 22, 2015

(65) Prior Publication Data

US 2016/0043935 A1    Feb. 11, 2016

Related U.S. Application Data

(63) Continuation of application No. 13/791,757, filed on Mar. 8, 2013, now Pat. No. 9,210,072.

(51) Int. Cl.
*H04L 12/28* (2006.01)
*H04L 12/761* (2013.01)
*H04L 12/18* (2006.01)
*H04L 12/709* (2013.01)
*H04L 12/741* (2013.01)
*H04J 1/16* (2006.01)

(52) U.S. Cl.
CPC .......... *H04L 45/16* (2013.01); *H04L 12/1886* (2013.01); *H04L 45/245* (2013.01); *H04L 45/54* (2013.01); *Y02B 60/33* (2013.01)

(58) Field of Classification Search
USPC ................................ 370/369, 390, 389, 487
See application file for complete search history.

(56) References Cited

U.S. PATENT DOCUMENTS 6,457,059 B1 * 9/2002 Kobayashi ............ H04L 12/185
709/242
7,664,878 B2    2/2010 Takahashi et al.
7,924,837 B1 * 4/2011 Shabtay .............. H04L 12/1886
370/235

(Continued)

OTHER PUBLICATIONS

Virtual Router Redundancy Protocol, Cisco IOS Release 12.0(18)ST, 12.0(22)S, 12.2(13)T, and 12.2(14)S, no later than Dec. 7, 2012.

(Continued)

*Primary Examiner* — John Pezzlo
(74) *Attorney, Agent, or Firm* — Haynes and Boone, LLP

(57) ABSTRACT

Each router in a group of routers (110R.2, 110R.3) includes an interface (P4) assigned a common virtual address for multicast (VAM). The common VAM is advertised in router advertisings for multicast traffic; other addresses are advertised for unicast. The member routers in the group share multicast forwarding databases. Increased throughput is therefore provided for multicast traffic without traffic replication. Any router in the group can service requests from end-point sources and receivers of multicast traffic, e.g. requests to join or leave a multicast group, or requests presented as multicast packets for forwarding to a multicast group.

20 Claims, 6 Drawing Sheets

(56) References Cited

U.S. PATENT DOCUMENTS

| | | | |
|---|---|---|---|
| 2005/0169270 | A1 | 8/2005 | Mutou et al. |
| 2006/0184663 | A1* | 8/2006 | Takahashi ............. H04L 12/185 709/224 |
| 2008/0137660 | A1* | 6/2008 | Olakangil ........... H04L 12/1836 370/392 |
| 2011/0292833 | A1 | 12/2011 | Kapitany et al. |
| 2012/0039335 | A1 | 2/2012 | Subramanian et al. |
| 2012/0275297 | A1 | 11/2012 | Subramanian |
| 2012/0314581 | A1 | 12/2012 | Rajamanickam et al. |
| 2014/0157298 | A1 | 6/2014 | Murphy |
| 2014/0233446 | A1* | 8/2014 | Fanfelle ................. H04W 4/06 370/312 |

OTHER PUBLICATIONS

IP Multicast Technology Overview, no later than Dec. 6, 2012, 15 pages http:www.cisco.com/en/US/docs/ios/solutions_docs/ip_multicast/White_papers/mcst_over . . . .

PIM-SM Multicast Routing Protocol, no later than Feb. 21, 2013, 24 pages, http://technet.microsoft.com/en-us/library/bb742462.aspx.

Dynamic Routing Protocols, no later than Dec. 12, 2012, 13 pages total, http://www.pcvr.nl/tcpip/dynamic.htm.

IP: Internet Protocol, no later than Dec. 12, 2012, 17 pages total, http://www.pcvr.nl/tcpip/ip_inter.htm.

IP Routing, no later than Dec. 11, 2012, 14 pages total, http://www.pcvr.nl/tcpip/ip_rout.htm.

PIM Sparse Mode Module 5, Module5.ppt, Cisco Systems, Inc., Aug. 10, 2001, 138 pages total.

Understanding PIM Register Process, no later than Oct. 24, 2012, 4 pages total, http://blog.ipexpert.com/2011/05/04/understanding-pim-register-process . . . .

10 Gigabit Ethernet Virtual Data Center Architectures, White Paper Force 10, no later than 2007, 11 pages total.

VLANs and Trunking, on or before Feb. 21, 2013, 143 pages total.

Philippe Duchamp, VLT: Virtual Link Trunking-Maximizing Datacenter Capacity with Dell Force 10 Switches, Jan. 16, 2013, 2 pages total http://en.community.dell.com/dell-blogs/direct2dell/archive/2013/01/16/vlt-vi . . . .

VRRP configuration, on or before Dec. 7, 2012, 66 pages total.

RFC 6754, Cai et al., Protocol Independent Multicast Equal-Cost Multipath (ECMP) Redirect, Oct. 2012, 12 pages total.

Virtual Router Redundancy Protocol, no later than Oct. 24, 2012, 3 pages total, http://en.wikipedia.org/wiki/Virtual_Router_Redundancy_Protocol.

RFC 4601, Fenner et al., Protocol Independent Multicast-Sparse Mode (PIM-SM): Protocol Specification (Revised), 2006, 112 pages total.

Defining the Router ID and Loopback Interfaces, no later than Jan. 22, 2013, 1 page total, http://www.cathayschool.com/defining -the-router-id-and-loopback-interfaces----a1343.html.

Open Shortest Path First, no later than Jan. 22, 2013, 13 pages total, http://en.wikipedia.org/w/index.php?title=Open_Shortest_Path_First&printable=yes.

The Protocols of IP Multicast, Sep. 5, 2001, 4 pages total, http://www.netcraftsmen.net/resources/archived-articles/435-the-protocols-ofip-multicas . . . .

RFC 5798, Nadas, Virtual Router Redundancy Protocol (VRRP) Version 3 for IPv4 and IPv6, Mar. 2010, 41 pages total.

IP Multicast Technology Overview, DIG: Enterprise Campus Topology, no later than Dec. 6, 2012, 26 pages.

RFC 4604, Holbrook et al., Using Internet Group Management Protocol Version 3 (MGMPv3) and Multicast Listener Discovery Protocol Version 2 (MLDv2) for Source-Specific Multicast, Aug. 2006, 12 total pages.

Packet Switch Modules for Computer Networks With Efficient Management of Databases Used in Forwarding of Network Traffic, Janardhanan et al., U.S. Appl. No. 13/679,427, filed Nov. 16, 2012.

* cited by examiner

Hello message 910

Join/Prune message 1010

Join/Prune message 1110

PROCESSING OF MULTICAST TRAFFIC IN COMPUTER NETWORKS

CROSS REFERENCE TO RELATED APPLICATIONS

The present application is a continuation of U.S. patent application Ser. No. 13/791,757, filed on Mar. 8, 2013, incorporated herein by reference.

BACKGROUND OF THE INVENTION

The present invention relates to information handling systems (IHSs) that include network switches, i.e. devices that forward data in computer networks. More particularly, the invention relates to IHSs that can process multicast traffic in computer networks.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. IHSs may include a variety of hardware and software components that may be configured to process, store, and communicate information and may include one or more computer systems, data storage systems, and networking systems, such as a network switch.

FIG. 1 shows an example of a computer network with nodes 110 (shown as 110.1, 110.2, 110S.1, 110R.2, etc.) interconnected by wired or wireless links 120. Each node 110 is an IHS, and may (or may not) include a network switch, i.e. a node 110 may forward data transmitted between other nodes. Some switches are shown at 110S and 110R. As shown in FIG. 2, each link 120 is connected to port interfaces Px (i.e. P1, P2, etc.) of two or more nodes 110. A data packet transmitted on a link 120 may include a layer-2 packet 208 (FIG. 3), which includes a layer-2 source address 210S (FIG. 3), a layer-2 destination address 210D, and a layer-2 payload 210P. Each of source and destination addresses 210S, 210D can be a physical address of a port interface Px of a node 110, or can be a logical layer-2 address of a group of ports of the same or different switches 110 any one of which can process the packet. (We use the words "port" and "port interface" interchangeably. A port can be a physical wired or wireless port, or for example can be part of a physical port's bandwidth. Both parallel and serial ports are covered by this term.) Logical layer-2 addresses are used to form Link Aggregation Groups (LAGs) described below.

A switch 110S or 110R, e.g. 110S.1, has a number of ports Px connected to respective LAN segments 130 (Local Area Network segments). Each LAN segment 130 includes one or more nodes 110. The switch 110 (110S or 110R) may be a layer-2 switch that forwards packets based on layer-2 addresses 210S, 210D. However, if a packet is addressed to the switch itself, i.e. the destination address 210D identifies the switch, then the switch may use layer-2 payload 210P to process the packet. Layer-2 payload 210P may include a layer-3 packet (e.g. IP packet) as shown in FIG. 3. The layer-3 packet includes a layer-3 source address 220S, a layer-3 destination address 220D, and a layer-3 payload 220P. The switch may forward the packet based on layer-3 destination address 220D for example.

A switch may or may not be capable of performing such layer-3 forwarding. As used herein, the term "switch" is a general term for a forwarding network node, including bridges and routers. The term "router" means a switch that can perform layer-3 forwarding, i.e. forwarding based on layer-3 destination address 220D. A router may or may not perform layer-2 forwarding. Some routers are marked as 110R in FIG. 1.

To forward a packet 208, the switch 110 determines an interface Px on which the packet must be transmitted. The interface is determined from the destination layer-2 or layer-3 address 210D or 220D. The switch learns the layer-2 addresses from incoming packets: if a packet arrives at some interface from some source address 210S, the switch associates the address with the interface for future forwarding operations. A router 110 learns the layer-3 address information from other routers, which exchange the pertinent information by executing routing protocols (such as Routing Information Protocol (RIP), Open Shortest Path First (OSPF), Border Gateway Protocol (BGP), and others).

This layer-2 or layer-3 knowledge gained by each switch is suitable for unicast transmissions, i.e. when each address 210D or 220D identifies a single node 110. This knowledge is hard to use for layer-3 multicast, i.e. when an address 220D identifies a group of nodes 110.

A multicast transmission can reduce network utilization by transmitting only one copy of a packet over a shared path. For example, if a node 110.4 in FIG. 1 transmits a multicast packet 208 to a group including the nodes 110.9 and 110.10, then only one copy of the packet needs to be delivered from node 110.4 to router 110R.2. The packet is duplicated only at router 110R.2, with one copy transmitted to each of nodes 110.9, 110.10 over separate paths. Significant gains in network utilization can be achieved, especially when large numbers of such packets need to be transmitted (for example if the packets are a moving picture distributed to millions of viewers, or are voices and images of teleconference participants).

An important goal of multicast processing is to reduce redundant traffic: preferably, at most one copy of each packet should appear on each link 120. This goal is also important for unicast transmissions: unicast packets can be unnecessarily replicated due to presence of loops (redundant paths) in the network. For example, a packet can reach the switch 110S.1 from router 110R.4 via a path through router 110R.2, or a path through router 110R.3; there are paths through any one or both of these routers. Redundant paths are provided in order to increase the network bandwidth and reliability, but they may have to be disabled to reduce traffic replication. To keep redundant paths active, a network may use Link Aggregation Groups (LAGs) or Equal Cost Multi-Path routing (ECMP).

A LAG denotes a group of ports which is associated with a single logical layer-2 address. For example, in FIG. 1, port P4 of router 110R.4 is a LAG port, containing physical ports connected respectively to ports P4 of routers 110R.2 and 110R.3. If router 110R.4 must forward a packet on its port P4, the router transmits the packet on just one of the physical ports, so the packet is forwarded to router 110R.2 or 110R.3 but not both. (The physical port may be selected randomly, and/or based on a hash of information in the packet, e.g. of the headers' fields 210S, 210D, 230S, 230D, the IP type field (not shown), and/or some other fields.)

Further reduction in packet replication can be achieved by coordination among routers. For example, routers 110R.2 and 110R.3 can form a Virtual Link Trunking (VLT) system 140, such as described in U.S. Pre-Grant Patent Publication US 2011/0292833 (Dec. 1, 2011) incorporated herein by reference; both routers 110R.2, 110R.3 can be of type S4810 available from Dell Inc. of Texas, United States. In the example of FIG. 1, "InterCluster" Link 120.0 (ICL) of VLT system 140 is connected to ports P1 of routers 110R.2 and 110R.3. The ports P3 of the two routers are connected to a LAG port P3 of switch 110S.1. The ports P5 of routers 110R.2 and 110R.3 are connected to a LAG port P5 of router 110R.20.

The ports such as P3, P4, P5 of routers 110R.2 and 110R.3 will be called virtual ports herein. More particularly, if the two routers 110R.2 and 110R.3 have ports connected to a common LAG port of another switch, such ports of routers 110R.2 and 110R.3 will be called virtual ports. The routers 110R.2 and 110R.3 may have any number of virtual ports.

Routers 110R.2 and 110R.3 may include non-virtual ports, such as port P10 of router 110R.2.

Routers 110R.2 and 110R.3 exchange learned information regarding packet forwarding. The exchange is performed via link 120.0.

The traffic received on link 120.0 is restricted to reduce traffic replication. More particularly, if a VLT member router 110R.2 or 110R.3 receives a packet on link 120.0, the router will not forward the packet on any virtual port. For example, if router 110R.2 receives a packet on port P1, it will not forward the packet on its ports P3, P4, P5 because the packet is forwarded to switches 110S.1, 110R.4, 110R.20 by router 110R.3 if needed.

ECMP is a layer-3 mechanism to suppress traffic replication while keeping redundant paths. In ECMP, the layer-3 destination address is associated with a group of ports by the router's database. The router forwards a packet on just one of the ports. The port on which the packet is forwarded may be selected randomly and/or based on a hash of the packet header's fields.

Some challenges for multicast transmission will now be described on the example of IGMP (Internet Group Multicast Protocol) and Sparse-Mode PIM (Protocol Independent Multicast). IGMP is defined for example by RFC 4604 (Internet Engineering Task Force (IETF), August 2006). Sparse-Mode PIM is defined by RFC 4601 (IETF August 2006). RFCs 4604 and 4601 are incorporated herein by reference. IGMP defines how a multicast end-point (sender or receiver) 110 can request joining or leaving a multicast group. PIM defines how routers 110R set up multicast paths for distribution of multicast packets.

According to Sparse Mode PIM, each end-point sender or receiver 110 of multicast traffic is associated with a single Designated Router (DR). Suppose for example that the switch 110S.1 does not perform layer-3 forwarding. Then end-point nodes 110.1, 110.2, 110.3 can be associated with router 110R.2 or 110R.3 as a DR. However, in order to reduce traffic replication, RFC 4601 allows only one router to serve as a DR for a LAN. The reason for this restriction is as follows. Suppose that both routers 110R.2 and 110R.3 serve as DRs. Suppose further that a multicast group contains nodes 110.1, 110.2, 110.3; router 110R.2 serves as a DR for nodes 110.1 and 110.2, and router 110R.3 is a DR for node 110.3. Then a packet from node 110.4 to the group would be forwarded to nodes 110.1 and 110.2 through router 110R.2, and to node 110.3 through router 110R.3. Therefore, the packet would have to be duplicated at router 110R.4. If only router 110R.2 served as a DR, then the packet could be delivered to all nodes 110.1, 110.2, 110.3 without duplication.

On the other hand, if there is only one DR, say only router 110R.2 is a DR, then the multicast traffic cannot use the additional bandwidth provided by the path through router 110R.3.

SUMMARY

This section summarizes some features of the invention. Other features may be described in the subsequent sections. The invention is defined by the appended claims, which are incorporated into this section by reference.

In some embodiments, the invention allows multiple routers to serve as DRs without unnecessary packet replication. In some embodiments, this is done by defining separate addresses (virtual addresses) for routers' interfaces for use in multicast. The addresses are advertised to other routers and are used in a way to reduce or eliminate redundant traffic. For example, routers 110R.2 and 110R.3 can advertise the same virtual address on their ports P4 for multicast. The two routers may use other addresses for unicast traffic as in prior art. Due to this independence between the multicast and unicast protocols, some multicast embodiments of the present invention may be conveniently combined with many unicast protocols.

The invention is not limited to the network of FIG. 1, to Sparse-Mode PIM or other PIM modes, to IGMP, to VLTs, the presence of LANs, or to DRs. For example, in some embodiments, more than two routers use the same address for multicast. Such routers can be provided at any point of a multicast-capable network, to enhance the network performance at that point in terms of throughput, reliability, available router memory, the number of port interfaces.

The invention is not limited to the features and advantages described above except as defined by the appended claims.

DESCRIPTION OF SOME EMBODIMENTS

The embodiments described in this section illustrate but do not limit the invention. The invention is defined by the appended claims.

Figure 4:
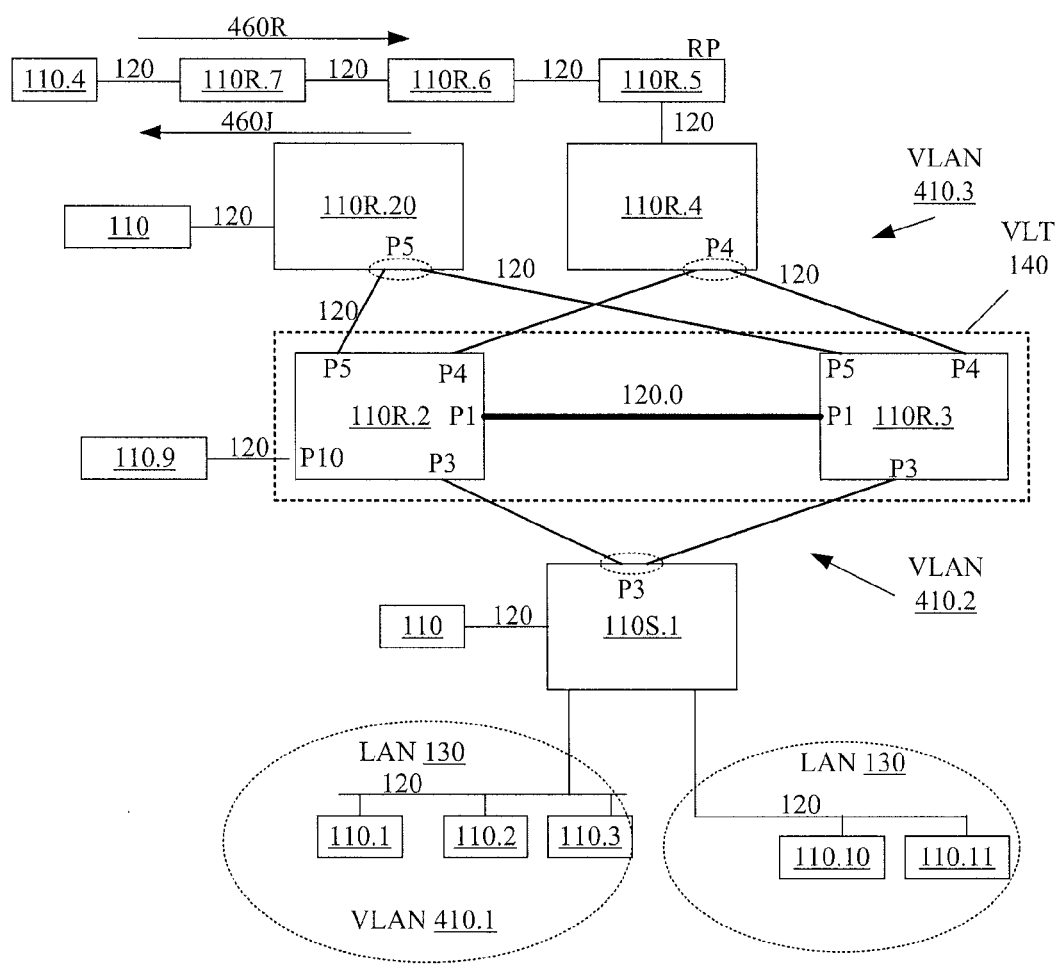
FIGS. 4 and 5 are block diagrams illustrating multicast transmissions in computer networks according to prior art.

While the invention is not limited to PIM, some embodiments will now be illustrated on the example of Sparse-Mode PIM. FIG. 4 illustrates a PIM domain with a multicast group which includes nodes 110.1, 110.2, 110.3 on a VLAN

410.1. A VLAN (Virtual LAN) is a layer-2 broadcast domain, which may be all or part of a LAN. Switch 110S.1 connects this VLAN to another VLAN 410.2. Routers 110R.2 and 110R.3 of VLT system 140 are connected in parallel between VLAN 410.2 and VLAN 410.3 to provide redundant paths between the two VLANs. Router 110R.4 connects the VLAN 410.3 to a router 110R.5 which is the Rendezvous Point (RP) for the PIM domain. The Rendezvous Point is the root of a distribution tree for a multicast group: to send a multicast packet to the group, the packet is sent to the RP and is distributed from the RP to each group member 110. For example, if a node 110.4 is the source of a multicast packet, and the multicast group consists of nodes 110.1, 110.2, 110.3, then the packet is delivered from source 110.4 to the RP 110R.5 (through routers 110R.7 and 110R.6), and from the RP to group members 110.1, 110.2, 110.3. If a node 110.1 is the source, the packet may still be delivered to the other group members through the RP.

Router 110R.20 connects VLAN 410.3 to a node 110.

VLT ports P3 of routers 110R.2, 110R.3 are connected to LAG port P3 of switch 110S.1. VLT ports P4 of routers 110R.2, 110R.3 are connected to LAG port P4 of router 110R.4. VLT ports P5 of routers 110R.2, 110R.3 are connected to LAG port P5 of router 110R.20.

If switch 110S.1 cannot perform layer-3 forwarding, then router 110R.2 or 110R.3 may serve as a DR for nodes 110.1, 110.2, 110.3. Suppose that only one of routers 110R.2 and 110R.3 serves as a DR, e.g. router 110R.2 is the DR, and it contains a multicast routing database for forwarding multicast packets, but router 110R.3 is not a DR and does not have a multicast routing database. Suppose that switch 110S.1 uses the LAG port P3 to send a multicast packet to router 110R.3. Since the router 110R.3 does not have the packet's multicast address 220D in the router's routing databases, the router 110R.3 will flood the packet to router 110R.2 over link 120.0, so the packet will be delayed and the router resources will be wasted. This could be avoided if both routers 110R.2, 110R.3 served as DRs.

Another example of inefficient router utilization is related to communications between the RP router 110R.5 and a source of multicast packets. When a source 110 (say, 110.4) first sends multicast packets to a multicast group through the RP, the intermediate routers (such as 110R.7 and 110R.6) are not necessarily provisioned to forward the multicast packets (to recognize the multicast address 220D), so the source's DR (110R.7) encapsulates the packets into unicast packets. Such encapsulation and forwarding is known as "Register" operation and is marked by arrow 460R. When the RP 110R.5 receives an encapsulated packet from the source, the RP de-encapsulates the packet and forwards it to the group. In addition, the RP sends a "Join(S,G)" packet towards the source (as shown by arrow 460J) to provision the intermediate routers 110R.6 and 110R.7 to enable them to forward multicast packets without encapsulation.

Figure 5:
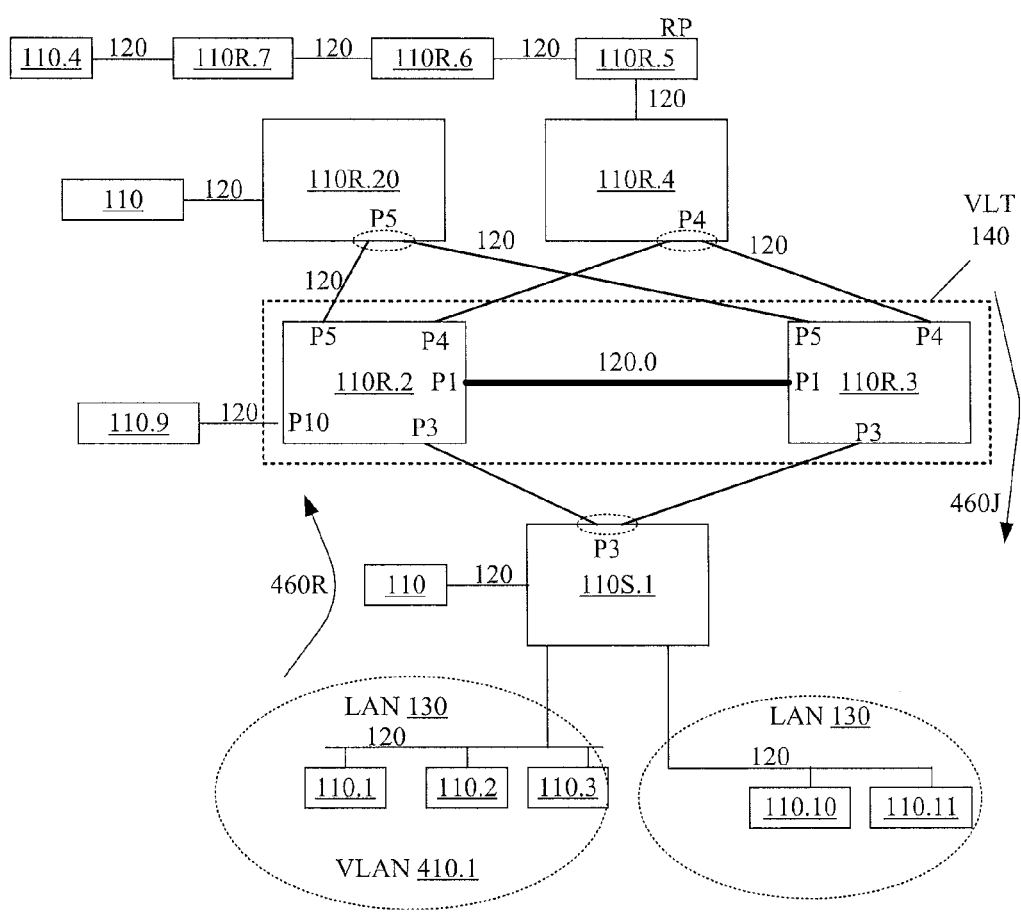

Now suppose that host 110.1 is a source of multicast packets. See FIG. 5. The source 110.1 sends the packets to the RP as shown by arrow 460R, for distribution to the group. The packets are sent through DR 110R.2, which encapsulates the packets. Then RP 110R.5 sends the Join(S,G) packet towards the source (arrow 460J) to provision the intermediate routers (including 110R.4) for forwarding without encapsulation. Suppose that the routers 110R.2 and 110R.3 are configured as an Equal Cost MultiPath group (ECMP) by router 110R.4. This means that the router 110R.4 can forward the Join(S,G) packet to any one of these two routers as the target router. (The Join packets are broadcast to all PIM enabled routers (with address 220D designating all PIM routers), but the payload 220P shows the target router which is to be provisioned.) If the Join packet is targeted at router 110R.3, then router 110R.3 becomes provisioned to send the packets from source 110.1, but router 110R.2 does not. The source 110.1 will continue to send the multicast packets to its DR 110R.2, and the DR will continue to encapsulate them because it has not been provisioned to forward the packets without encapsulation.

Figure 6:
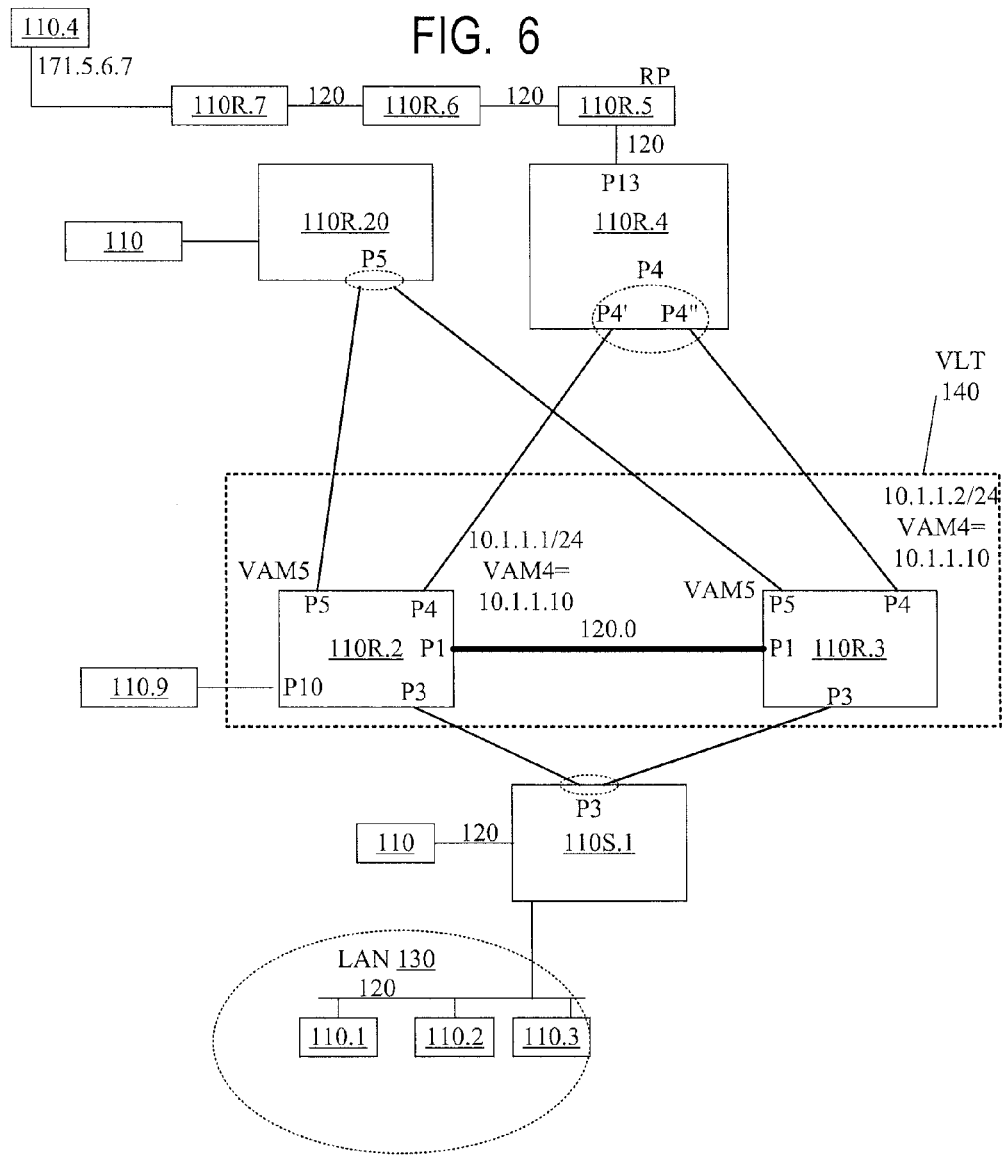
FIG. 6 is a block diagram of a computer network with routers according to some embodiments of the present invention.

In some embodiments, these problems are solved by provisioning both routers 110R.2 and 110R.3 as DRs. As noted above, when multiple routers serve as DRs for a single LAN, multicast packets may be unnecessarily replicated. In some embodiments of the present invention, such replication is reduced or avoided by configuring at least one pair of virtual ports of the routers 110R.2 and 110R.3 to have the same layer-3 address for multicast. (A port pair consists of the ports connected to the same LAG port of another router; e.g. the ports P4 of routers 110R.2, 110R.3 are a port pair.) The layer-3 address for multicast will be called herein "Virtual Address for Multicast" or VAM. FIG. 6 shows this address as VAM4 for the VLT ports P4, and as VAM5 for VLT ports P5. (FIG. 6 shows the same network as in FIGS. 4 and 5, but omits nodes 110.10 and 110.11 for simplicity). In the example of FIG. 6, port P4 of router 110R.2 has an address 10.1.1.1/24 advertised by the router for unicast traffic as in prior art, and has a VAM address VAM4, equal to 10.1.1.10, advertised for multicast traffic in accordance with some embodiments of the present invention. Port P4 of router 110R.3 has an address 10.1.1.2/24 advertised for unicast traffic, and VAM4 address 10.1.1.10 advertised for multicast traffic. Unicast traffic advertisements can be performed according to the routing protocol in use for unicast traffic (e.g. as link state advertisements in OSPF, or suitable advertisements in RIP or BGP). Multicast traffic advertisements can be performed according to the multicast protocol in use (e.g. as Hello messages in PIM). When forwarding packets to router 110R.2 or 110R.3, the router 110R.4 will obtain, from its databases (described below), the respective address 10.1.1.1 or 10.1.1.2 for forwarding unicast packets, and VAM4 (10.1.1.10) for forwarding multicast packets.

In this embodiment, each VAM is on the same subnet as the corresponding unicast-traffic addresses; for example, the VAM4 address 10.1.1.10 is in the same subnet as 10.1.1.1/24 and 10.1.1.2/24. This is desirable in case the router 110R.4 has a firewall; the VAM address is less likely to be filtered out by the firewall if the address is in the same subnet as the addresses for unicast. In some embodiments, one or both ports P4 of routers 110R.2 and 110R.3 may have secondary addresses for unicast, and the VAM4 address is in the same subnet as at least one of the secondary addresses. The two ports P4 may also have one or more secondary VAMs, each secondary VAM being assigned to both ports and, possibly, being in the same subnet as a primary or secondary address for unicast.

FIG. 6 assumes that the ports P4 and P5 of routers 110R.2, 110R.3, 110R.4, 110R.20 are PIM enabled. In some embodiments, VAMs are not provided for the non-VLT ports and/or for the ports connected to non-PIM-enabled ports of other nodes. For example, if switch 110S.1 is not PIM enabled, then the VLT ports P3 may or may not have a VAM.

Figure 7:
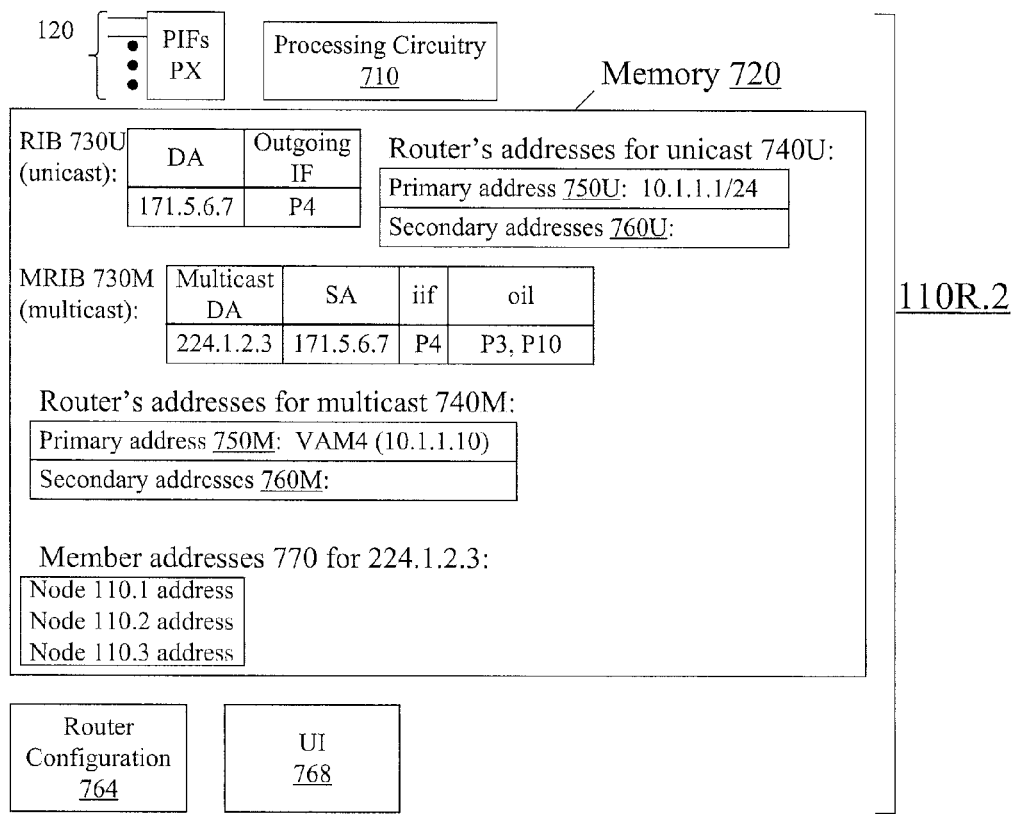
FIGS. 7 and 8 are block diagrams of routers according to some embodiments of the present invention.

FIG. 7 is a block diagram of router 110R.2. Like every node 110, router 110R.2 includes ports Px (including P3, P4, P5, P10) connected to links 120 and also includes processing circuitry 710 and memory 720. Circuitry 710 may include one or more computer processors executing computer instructions stored in memory 720, and/or may include hardwired (non-software-programmable) circuitry. Memory 720 is shown as a separate block, but all or part of this memory may be incorporated into circuitry 710 and/or port interfaces Px. Circuitry 710 and memory 720 may be split between a control plane and a data plane, each plane containing some of circuitry 710 and some of memory 720. The data plane forwards packets with emphasis on high performance, using mostly hardwired circuitry. The control plane monitors and programs the data plane (e.g. the control plane may provide routing databases to the data plane, and may execute routing algorithms and other applications). See e.g. U.S. pre-grant patent publication 2012/0039335 A1 (Feb. 16, 2012) of U.S. patent application Ser. No. 12/856,342 filed Aug. 13, 2010 by Subramanian et al.; this publication is incorporated herein by reference. See also U.S. patent application Ser. No. 13/679,427 filed Nov. 16, 2012 by Janardhanan et al., incorporated herein by reference. These are just exemplary architectures, not limiting the present invention.

Figure 1:
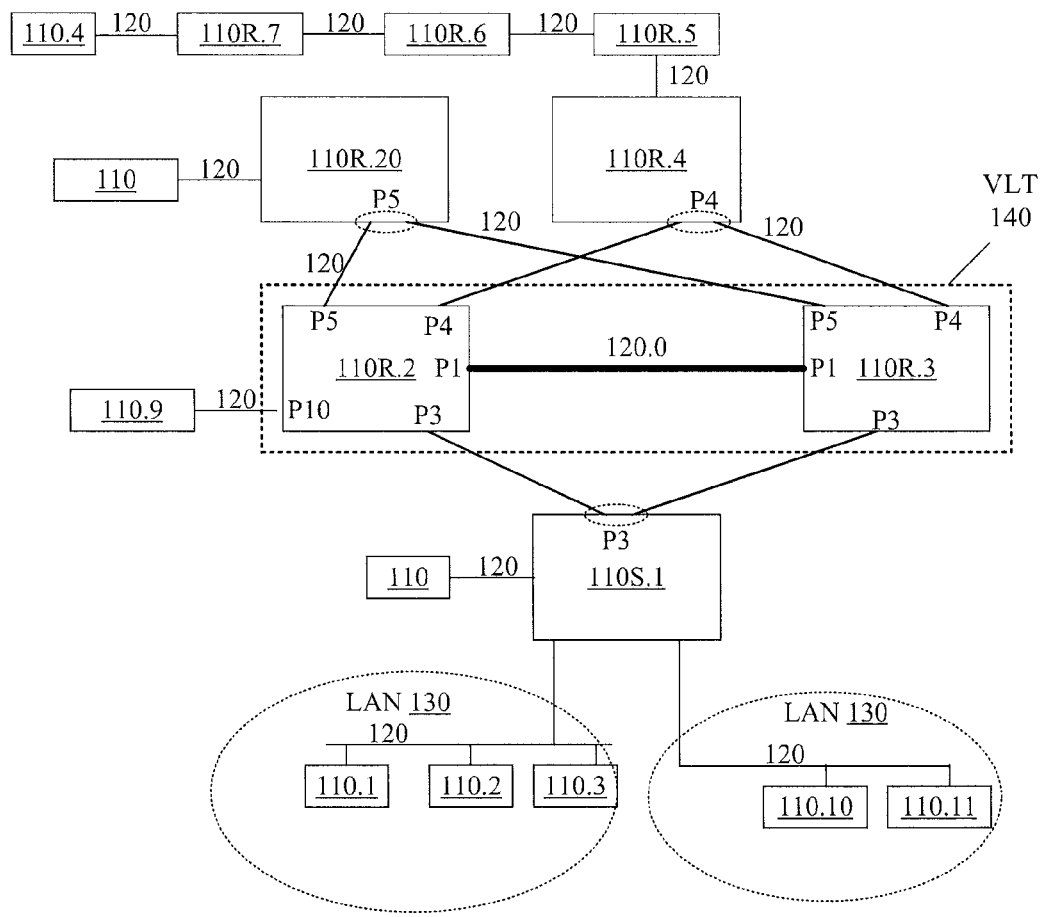
FIG. 1 is a block diagram of a computer network according to prior art.
Figure 2:
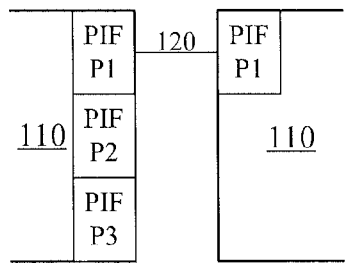
FIG. 2 is a block diagram of two network nodes interconnected by a network link according to prior art.
Figure 3:
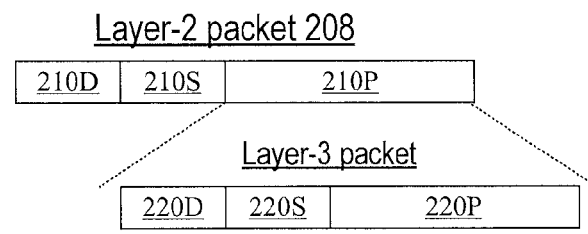
FIG. 3 is a block diagram of a layer-2 packet according to prior art.

Memory 720 stores unicast and multicast routing databases. For ease of description, the unicast and multicast databases are shown separately as RIB 730U and MRIB 730M, but they may be merged into a single database. "RIB" stands for Routing Information Base, and "MRIB" for Multicast Routing Information Base. (In some embodiments, separate RIB and MRIB versions are stored in each of the data and control planes as known in the art.) RIB 730U can be any conventional unicast database. In the example of FIG. 7, RIB 730U contains a number of entries, with a single entry shown. In each entry:

1. "DA" is a layer-3 unicast destination address, such as can be present in field 220D (FIG. 3). This address is 171.5.6.7 in the entry shown in FIG. 7. This is the address of node 110.4 in FIG. 6.

2. "Outgoing IF" is the corresponding port interface Px (P4 in FIG. 7). In the example shown, a packet with destination address 171.5.6.7 is to be forwarded on interface P4.

An entry may contain other fields, e.g. layer-2 addresses for the outgoing packets. RIB 730U may contain other types of entries, default entries, entries with subnet destination addresses rather than node destination addresses, and other entries.

Multicast database 730M may also be conventional. See e.g. "PIM Sparse Mode; Module 5", Cisco Systems, Inc. (2001) incorporated herein by reference. In the example of FIG. 7, MRIB 730M contains a number of entries. In an exemplary entry:

1. "Multicast DA" is a layer-3 multicast address, such as can be present in field 220D. This address is 224.1.2.3 in the example shown.

2. "SA" is a layer-3 source address, such as can be present in field 220S of a multicast packet. The example of FIG. 7 shows the source address 171.5.6.7 (corresponding to node 110.4 in FIG. 6). The SA field may contain multiple sources, and may contain a wild card indicating any source. In some embodiments, a multicast packet with the destination address 220D in the entry's "Multicast DA" field is forwarded based on the entry only if the source address 220S is in the SA field.

3. "iif" is a port interface Px to which the entry pertains. This entry indicates P4 in the example of FIG. 7. Note that in FIG. 6, the router 110R.2 can receive multicast packets from node 110.4 on the router's interface P4 directly connected to router 110R.4. In some embodiments, a packet with the destination address 220D in "Multicast DA" and the source address 220S in "SA" is forwarded only if it is received on a port in "iif".

4. "oil" is the outgoing interface list which is a list of ports Px on which the packet is forwarded based on the entry. The "oil" is P3, P10 in the example of FIG. 7. For example, suppose the multicast address 224.1.2.3 denotes a group including the nodes 110.1, 110.2, 110.3, 110.9, and the router 110R.2 receives a packet with destination address 224.1.2.3 on the router's interface P4; the packet's source address 220S (FIG. 3) is 171.5.6.7, i.e. the address of node 110.4. Then based on this MRIB entry, the router 110R.2 will forward the packet on interface P3 (to switch 110S.1) and also on interfaces P10 to node 110.9.

MRIB 730M entries may include other information, e.g. layer-2 addresses to be assigned to the packets forwarded based on the entries.

As shown in FIG. 7, the router's memory 720 stores one or more router addresses 740U advertised by the router for unicast traffic, and one or more router addresses 740M advertised by the router for multicast traffic. FIG. 7 shows only the addresses advertised on the port P4; different addresses can be advertised on different ports as known in the art. In the example shown, these are IP (layer-3) addresses. The addresses 740U can be conventional; they include the primary address 750U (which is 10.1.1.1 in the example of FIG. 6), and may include one or more secondary addresses 760U. The primary address 750U is unique for the router. The secondary addresses 760U may or may not be unique.

The addresses 740M include the primary VAM 750M, i.e. VAM4 (10.1.1.10). This address is shared with router 110R.3. Secondary VAMs 760M can also be present, and can also be shared with router 110R.3.

The router includes a router configuration module 764 which receives the addresses for databases 740U and 740M and inserts the addresses into the databases. The module 764 may be part of circuitry 710 and/or ports PX and/or memory 720. For example, in some embodiments, module 764 includes software stored in memory 720 and executed by a processor in circuitry 710. In some embodiments, module 764 receives the addresses from a user interface module 768, or from a network port Px, or in some other way. The addresses can be provided by an administrator (a human) for example.

Memory 720 also includes the addresses 770 of nodes for which the router acts as a DR. Router 110R.2 will forward a multicast packet with destination address 224.1.2.3 to these nodes.

Router 110R.3 may have the same or different structure, with appropriate values in memory 720. The router 110R.3 may have the same VAM or VAMs for its port P4. The MRIB 730M entry for the address 224.1.2.3 will have the oil field of "P3, P1": the multicast packets will be forwarded on port P3 to nodes 110.1, 110.2, 110.3, and on port P1 to node 110.9.

Figure 8:
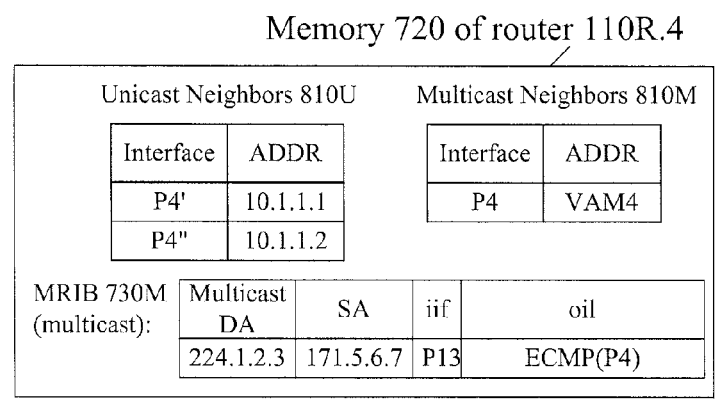

Router 110R.4 may have the same or different structure, with appropriate values in memory 720. FIG. 8 illustrates some information stored in memory 720 of router 110R.4. The MRIB entry for multicast address 224.1.2.3 has the SA of 171.5.6.7; the iif of P13 (which can receive multicast packets from node 110.4); and the outgoing interface list which includes an entry pointing to a group of ports, e.g. the physical ports P4' (connected to router 110R.2) and P4" (connected to router 110R.3) which form the logical port P4. Router 110R.4 can use any suitable algorithm (e.g. hashing of fields in a packet header) to select one of P4' and P4" for each multicast packet.

Router 110R.4 may also store a database 810U listing the neighbor routers for unicast forwarding. Other routers may also store such a database. This database is populated based on router advertisements received by router 110R.4. In the example shown in FIG. 8, the portion of database 810U of router 110R.4 for the interfaces P4', P4" indicates the addresses of ports P4 of adjacent routers 110R.2, 110R.3.

Database 810M provides the same kind of information for adjacent multicast routers. This database is populated based on the multicast protocol advertisements, e.g. PIM Hello messages. Assuming that the ports P4 of routers 110R.4, 110R.3, 110R.2 are on the same VLAN, the LAG port P4 of router 110R.4 corresponds to VAM4.

System 140 may have any number of member routers, operating in the manner described above. System 140 does not have to be located at the edge of a multicast domain; for example, switch 110S.1 can be PIM enabled, and can serve as a DR for end-point nodes 110.1, 110.2, 110.3. The virtual ports P3 can be provisioned with a VAM.

Pertinent aspects of router operation will now be described on the example of PIM Sparse Mode for some embodiments.

Neighbor Discovery.

Figure 9:
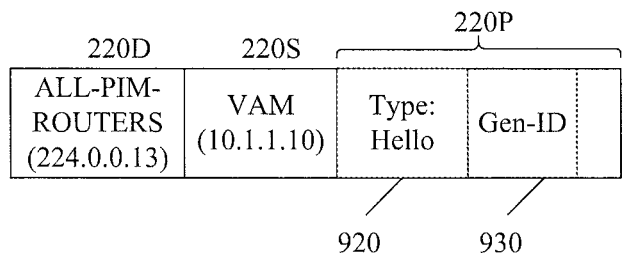
FIGS. 9, 10 and 11 are block diagrams of layer-3 packets used in a multicast protocol by routers according to some embodiments of the present invention.

Each multicast router (PIM router) periodically transmits "Hello" messages 910 (FIG. 9) on all its PIM-enabled interfaces Px (all the interfaces which can handle multicast traffic). Each Hello message is a packet broadcast to ALL-PIM-ROUTERS (224.0.0.13) as specified by its destination address 220D. In the embodiment of FIG. 9 (Sparse-Mode PIM), the Hello message is identified by a Type field 920 in the payload 220P. The invention is not limited to particular message formats.

In some embodiments, when routers 110R.2 and 110R.3 transmit Hello messages on any port having a VAM, the Hello messages have the source address 220S specifying the VAM. If secondary VAMs are present, they are specified in the Hello message payload. In some embodiments, the Hello messages do not include any addresses 740U for unicast. In other embodiments, the addresses for unicast are included in the payload for use as secondary addresses for multicast.

If an interface does not have a VAM, the Hello messages on this interface are conventional, i.e. they specify the corresponding address or addresses 740U used for unicast.

In some embodiments, when any member 110R.2, 110R.3 of the VLT system 140 receives a Hello message on any interface, the member router provides the Hello message to the other member router or routers (there may be more than two member routers) over the ICL 120.0, so that all the member routers update their respective databases 810M.

Further, according to PIM, a Hello message from any router 110R may include a Generation ID (Gen-ID) in its payload 220P (in field 930). Gen ID can be a different value for each interface Px of router 110R. This value is randomly generated by the router 110R whenever PIM forwarding is started or restarted on the interface. For example, when the router reboots, it re-generates all the Gen-ID values. When other multicast routers receive the new Gen-ID values, these routers realize that the router 110R may have been re-booted and may have to re-build its multicast-related databases (such as MRIB 730M or 810M). The other routers send appropriate data ("re-build data", which include the PIM Join states) to re-booted router 110R to allow the router 110R to re-build its multicast databases.

In some embodiments, if one of member routers (e.g. 110R.2 or 110R.3) of system 140 re-boots, it receives re-build data from the other member router or routers (via link 120.0 for example). It is desirable to eliminate unnecessary transmissions of the re-build data from non-member routers. Therefore, in some embodiments, all member routers (110R.2 and 110R.3) use the same Gen-ID value in all their Hello messages on all their interfaces. The common Gen_ID value can be established in a number of ways. It can be a non-random value generated from the respective VAM; for example, the Gen-ID value for ports P4 of routers 110R.2 and 110R.3 can be VAM4. Or the Gen-ID value can be randomly generated, e.g. by a designated one of routers 110R.2 and 110R.3 (the "primary" router), and transmitted to the other member router over the ICL link 120.0.

In some embodiments, when a member router (110R.2 or 110R.3) re-boots, it receives the common Gen-ID from the other member router or routers (there may be more than two routers in system 140). Therefore, the outside routers (i.e. the non-members) do not detect re-booting and do not transmit the re-build data unless all the member routers re-boot at about the same time.

In other embodiments, if any member router (e.g. 110R.2) re-boots, it generates a new Gen-ID value (e.g. a random value) for each interface, and sends the Gen_ID values for the virtual ports to the other member routers (such as 110R.3). In such embodiments, the outside routers may send re-build data to the virtual ports of the member routers upon detecting the new Gen-ID, but they send the re-build data only a limited number of times, once to each member router's virtual port upon the member router transmitting the new Gen-ID on the virtual port. In contrast, if router 110R.3 continued to use the old Gen-ID value (generated before re-booting of router 110R.2) while router 110R.2 used the new Gen-ID value, then the non-member routers would detect this as a frequent change of Gen-ID by each member router of system 140 (the old and new Gen-ID values would alternate and would be perceived as always new). Consequently, the non-members routers would re-send the re-build data to the member routers after each Hello message from the member routers, which is undesirable.

Join/Prune Messages.

According to PIM, when a node 110, e.g. 110.1, wants to join a multicast group to receive packets from one or more sources (possibly from any source), the node's DR sends a Join message towards the RP (e.g. in response to a request from the node 110 to join the group; the request may use the IGMP protocol for example). Join messages can also be sent towards a particular source (such as 110.4) to establish a shortest-path distribution tree from the source to the joining node's DR. In addition, a Join message can be sent by the RP towards a particular source to stop multicast packet encapsulation by the source's DR as explained above in connection with FIGS. 4 and 5, even if the source is not a member of the multicast group. When a router receives a Join message, the router updates its MRIB and other databases if needed, and sends a Join further to the RP or the source.

When a node 110 (say 110.1) wants to leave the multicast group, or to stop receiving multicast messages from a particular source or sources, the node's DR sends a Prune message (towards the RP or the particular sources). Such a Prune message can be sent for example in response to a request from node 110; the request may use the IGMP protocol for example. When a router receives a Prune message, the router updates its MRIB and other databases if needed, and sends a Prune further to the RP or the source.

Figure 10:
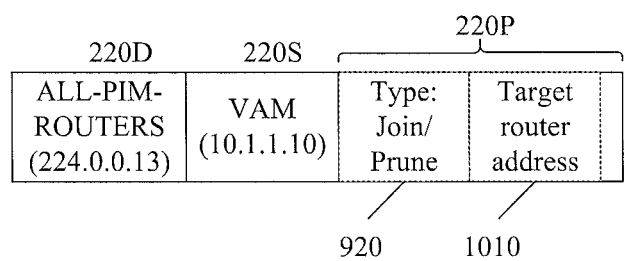

FIG. 10 illustrates some fields of an exemplary Join/Prune message in the Sparse-Mode PIM. The Join and Prune messages' destination address 220D is ALL-PIM-ROUTERS. The source address 220S indicates the interface on which the message is sent. The payload 220P includes a field 1010 identifying the target router (usually a multicast neighbor router) by a layer-3 address of the target router's interface. The target router receiving the Join or Prune message modifies its MRIB databases 730M to set up, modify, or tear down multicast distribution paths.

In some embodiments of the present invention, when the member routers of system 140 transmit Join or Prune messages on an interface having a VAM, they use the VAM address as source address 220S. Either a primary or a secondary VAM can be used. For example, some embodiments use only the primary VAM.

Figure 11:
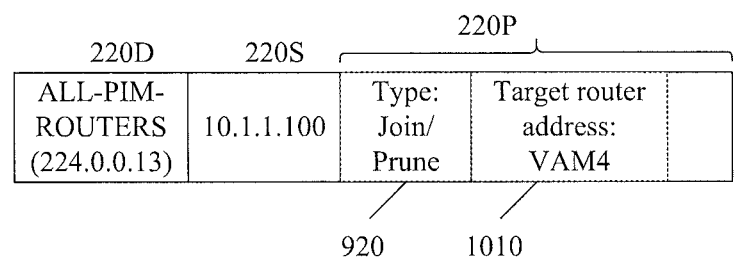

When a member router receives a Join or Prune message on an interface having a VAM, and the target router is one of the member routers, the target router is specified as the VAM. FIG. 11 illustrates an exemplary Join/Prune message 1110 sent by router 110R.4 on interface P4' or P4'' which has an address of 10.1.1.100. This address is shown in field 220S. The target router's address in field 1010 is VAM4, which is obtained from the database 810M (FIG. 8) by router 110R.4.

In some embodiments, if any router outside of system 140 sends any control message (e.g. Join/Prune) to a router in VLT system 140 according to a multicast protocol, and the message identifies the router in VLT system 140 by an interface address, and the interface has a VAM, then the message identifies the router by the VAM (primary or secondary).

In some embodiments, only one of the member routers sends the Join and Prune messages to the outside routers on behalf of system 140 on the virtual ports. The member router sending the Join or Prune message may be selected according to any desired policy, e.g. may always be the primary member router. Duplicative Join and Prune messages are thus avoided.

In some embodiments, when any member router (110R.2 or 110R.3) receives a Join or Prune message, the member router sends the Join or Prune message to the other member routers (via ICL 120.0 for example). If the target router's address is a VAM of any interface of a member router, then each member router updates its databases 730M to set up, modify, or tear down multicast paths as indicated in the message. In some embodiments, similar processing is performed upon receipt of requests from end-point nodes 110 to join or leave a multicast group: if the request is received by one member router, it is sent to the other member router or routers over the link 120.0. Therefore, all the member routers are provisioned to handle the same multicast traffic. (Provisioning is performed as suitable for a particular router architecture; for example, in some embodiments, provisioning involves modifying the MRIB and other databases in the router's data plane, e.g. in the data plane's content addressable memory (CAM); these examples are not limiting.)

As noted above, in some embodiments, at most one member router sends the Join and Prune messages to non-member routers on the virtual ports. For example, if a member router receives a Join or Prune message, or receives an IGMP request for which a Join or Prune is to be generated, then one of the member routers is selected to send the Join or Prune on the virtual ports. The member router may be selected as the router receiving the Join or Prune or the IGMP request, or may always be the primary member router, or may be selected according to some other policy. Replication of Join and Prune messages is thus avoided. (Other embodiments do not avoid such replication.)

In some embodiments, when a non-member router (e.g. 110R.4) receives a Join message on a member port of a LAG, e.g. on port P4' or P4'', the non-member router modifies its MRIB 730M to forward multicast packets on the LAG port (e.g. P4), so that the packet can be forwarded on any member port, to any member router. Similarly, when a Prune is received, the non-member router modifies its MRIB 730M for the LAG port.

In some embodiments, the member routers are configured so that if a member router is not provisioned to forward a multicast packet, the member router will not send the packet to other member routers (via link 120.0). Indeed, since all the member routers are provisioned for the same multicast traffic (due to sharing of the Join and Prune messages), if a member router is not provisioned for a multicast message then neither are the remaining member routers.

In some embodiments, the member routers do not share unicast updates: when a member router learns forwarding information about a layer-2 or layer-3 unicast address, the member router does not share this information with any other member router. Therefore, if a member router is not provisioned to forward a unicast message, the message is forwarded to another member router or routers over the link 120.0. In other embodiments, the member routers share unicast updates, and the unicast messages are not forwarded to other member routers if the member router first receiving the unicast messages does not know how to forward them.

In some embodiments, the member routers use the same source address (e.g. primary VAM) for all multicast-related operations for the ports connected to the same LAG port of an outside router. In other embodiments, the same VAM is not used for all multicast-related operations, e.g. for the Register operation (460R in FIGS. 4 and 5). For example, in some embodiments, when a member router is a DR for a multicast source (e.g. for node 110.1 as a source), the member router uses its address for unicast (10.1.1.1 for port P4 of router 110R.2; 10.1.1.2 for port P4 of router 110R.3) as the source address 220S in the encapsulated unicast packets for the Register operations. The RP's Register-Stop command, send to cause the member router to stop encapsulation, will also use the member router's address for unicast.

Some embodiments of the present invention provide a method for operating a first switch (e.g. 110R.2) comprising a plurality of interfaces which include a first interface (e.g. P4). The method comprises:

obtaining, by the first switch, a first address (e.g. 10.1.1.1) of the first switch and a second address (e.g. 10.1.1.10) of the first switch;

advertising by the first switch, on the first interface, the first address (e.g. in link advertisements), wherein the first interface is connected to one or more second interfaces of one or more second switches (e.g. LAG interface P4 of switch 110R.4) in a network comprising the first switch, wherein the first interface and each second interface are operable to transmit and/or receive unicast packets according to a first unicast protocol and multicast packets according to a first multicast protocol, the first switch advertising the first address in accordance with the first unicast protocol, to enable the one or more second switches to forward unicast packets to the first switch in accordance with the first unicast protocol;

advertising by the first switch, on the first interface, the second address in accordance with the first multicast protocol but not in accordance with the first unicast protocol, wherein the second address is for use by the one or more second switches in sending one or more multicast control packets (e.g. Join/Prune in PIM) to the first switch in accordance with the first multicast protocol, wherein the second address is different from the first address.

In some embodiments, the network comprises, in addition to the second switches, a group of switches (e.g. 110R.2 and 110R.3) which includes the first switch;

the group of switches comprises a group of interfaces (e.g. interfaces P4 of switches 110R.2 and 110R.3) which are connected to a logical interface of a corresponding switch (e.g. P4 of 110R.4) which is one of the one or more second switches, the group of interfaces including at least one interface of each member switch of the group of switches;

wherein the corresponding switch is operable to select the logical interface for transmitting thereon a unicast or multicast packet, and when the logical interface is selected then the second switch transmits the unicast or multicast packet on the logical interface to at most one of the group of switches;

wherein for each member switch, for each interface which belongs to the member switch and to the group of interfaces, the method comprises the member switch advertising, on the interface:

a first address of the member switch, the first address being advertised in accordance with the first unicast protocol, to enable the one or more second switches to forward unicast packets to the member switch in accordance with the first unicast protocol; and a second address of the member switch, the second address being advertised in accordance with the first multicast protocol but not in accordance with the first unicast protocol, wherein the second address is for use by the one or more second switches in sending one or more multicast control packets to the member switch in accordance with the first multicast protocol, wherein the second address is different from the first address of the member switch;

wherein the second addresses of all the member switches are identical to each other; and wherein the first addresses of different member switches are different from each other.

In some embodiments, the first and second addresses are network addresses (layer-3 addresses). For example, IP addresses can be used.

The invention is not limited to the IP addresses. In some embodiments, the first and second addresses are constructed according to a protocol independent of any network medium. For example, the IP addresses are independent of the network medium.

In some embodiments, the member switches share multicast updates:

each member switch comprises a database specifying processing of multicast packets according to the first multicast protocol;

the first switch receives updates to the first switch's database from one or more other member switches upon any one of the one or more other member switches receiving the updates from outside the group of switches; and wherein the first switch sends updates to one or more other member switches when the first switch receives updates from outside the group of switches.

In some embodiments, the method further comprises the first switch sending data on the first interface to one or more of second switches that operate according to the first multicast protocol, the data informing one or more switches outside the switch group about adding, deleting, or modifying a multicast path, the data identifying the first switch by the second address. Examples of such data are Join and Prune messages.

In some embodiments, each member switch is associated with a set of one or more network nodes (e.g. 110.1, 110.2, 110.3) to provide a service (e.g. as a DR) to each of the one or more network nodes with respect to the first multicast protocol, the service comprising at least one of:

servicing a request from each of the one or more network nodes to join or leave a multicast group or to change participation in a multicast group;

forwarding a multicast packet according to the first multicast protocol;

receiving a multicast packet according to the first multicast protocol to deliver the multicast packet to the network node to which the service is provided;

wherein each member switch is operable to communicate with any node of the set outside the switch group to provide said service.

Some embodiments provide information handling systems including the first switch, and provide computer readable medium comprising computer programs for causing the first switch to perform the methods described above.

The invention is not limited to the embodiments described above. For example, the group of routers does not have to include a designated router for any node. Other embodiments and variations are within the scope of the invention, as defined by the appended claims.

The invention claimed is:

1. A method comprising performing operations by a first switch comprising a plurality of interfaces, the operations comprising:

forwarding data packets on the interfaces, each data packet comprising a destination address, the destination addresses being constructed according to a protocol which is the same protocol for all the destination addresses, each destination address being a unicast address or a multicast address, each data packet being forwarded based on the data packet's destination address;

transmitting control packets on the interfaces, the control packets identifying the first switch by addresses constructed according to said protocol according to which the destination addresses are constructed, wherein for at least one said interface:

the control packets transmitted on the interface comprise control packets transmitted according to a unicast protocol and control packets transmitted according to a multicast protocol; and the control packets transmitted according to the unicast protocol identify the first switch by one or more first addresses constructed according to said protocol according to which the destination addresses are constructed, the control packets transmitted according to the multicast protocol identify the first switch by one or more second addresses which are different from any of the one or more first addresses and which are constructed according to said protocol according to which the destination addresses are constructed.

2. The method of claim 1 wherein for at least one said interface, no control packets are transmitted on the interface according to the multicast protocol.

3. The method of claim 1 wherein the first and second addresses are unicast addresses.

4. The method of claim 1 wherein the first switch is one of a group of switches, and for each switch in the group:

the switch comprises a plurality of interfaces;

the switch forwards data packets on the switch's interfaces such that each data packet comprises a destination address constructed according to said protocol according to which the destination addresses are constructed, and each data packet is forwarded by the switch based on the data packet's destination address;

the switch transmits control packets on the interfaces, the control packets identifying the switch by addresses constructed according to said protocol according to which the destination addresses are constructed, wherein for at least one interface of the switch:

the control packets transmitted on the interface comprise control packets transmitted according to the unicast protocol and control packets transmitted according to the multicast protocol; and the control packets transmitted according to the unicast protocol identify the switch by one or more first addresses corresponding to the interface and constructed according to said protocol according to which the destination addresses are constructed, the control packets transmitted according to the multicast protocol identify the switch by one or more second addresses corresponding to the interface which are different from any of the one or more first addresses corresponding to the interface and which are constructed according to said protocol according to which the destination addresses are constructed;

wherein the one or more second addresses corresponding to the interfaces for each switch in the group comprise at least one common address shared by all the switches in the group; and for at least one switch in the group, at least one first address corresponding to at least one said interface on which the switch transmits control packets according to the multicast protocol, is not shared by any other switch in the group.

5. The method of claim 4 wherein at least one common address corresponds to interfaces that are connected to a logical interface of a switch outside the group.

6. The method of claim 5 wherein the logical interface is a Link Aggregation Group.

7. The method of claim 5 wherein the switch outside the group transmits each packet with a destination address constructed according to said protocol according to which the destination addresses are constructed on at most one interface which is a member of the logical interface such that different members of the logical interface are being used for respective different packets with the same destination address.

8. The method of claim 1 wherein the protocol according to which the destination addresses are constructed is a network protocol.

9. The method of claim 1 wherein the protocol according to which the destination addresses are constructed is IP.

10. The method of claim 1 wherein the multicast protocol is Sparse Mode Protocol-Independent Multicast.

11. The method of claim 1 wherein the unicast protocol is an IP routing protocol.

12. A manufacture comprising one or more non-transitory computer readable media comprising a computer program operable to cause a first switch comprising a plurality of interfaces to perform a method comprising:

forwarding data packets on the interfaces, each data packet comprising a destination address, the destination addresses being constructed according to a protocol which is the same protocol for all the destination addresses, each destination address being a unicast address or a multicast address, each data packet being forwarded based on the data packet's destination address;

transmitting control packets on the interfaces, the control packets identifying the first switch by addresses constructed according to said protocol according to which the destination addresses are constructed, wherein for at least one said interface:

the control packets transmitted on the interface comprise control packets transmitted according to a unicast protocol and control packets transmitted according to a multicast protocol; and the control packets transmitted according to the unicast protocol identify the first switch by one or more first addresses constructed according to said protocol according to which the destination addresses are constructed, the control packets transmitted according to the multicast protocol identify the first switch by one or more second addresses which are different from any of the one or more first addresses and which are constructed according to said protocol according to which the destination addresses are constructed.

13. The manufacture of claim 12 wherein the one or more computer readable media are a memory of the first switch.

14. The manufacture of claim 13 wherein the first and second addresses are unicast addresses.

15. The manufacture of claim 12 wherein the computer program is operable to cause the first switch to operate as one of a group of switches, such that for each switch in the group:

the switch comprises a plurality of interfaces;

the switch forwards data packets on the switch's interfaces such that each data packet comprises a destination address constructed according to said protocol according to which the destination addresses are constructed, and each data packet is forwarded by the switch based on the data packet's destination address;

the switch transmits control packets on the interfaces, the control packets identifying the switch by addresses constructed according to said protocol according to which the destination addresses are constructed, wherein for at least one interface of the switch:

the control packets transmitted on the interface comprise control packets transmitted according to the unicast protocol and control packets transmitted according to the multicast protocol; and the control packets transmitted according to the unicast protocol identify the switch by one or more first addresses corresponding to the interface and constructed according to said protocol according to which the destination addresses are constructed, the control packets transmitted according to the multicast protocol identify the switch by one or more second addresses corresponding to the interface which are different from any of the one or more first addresses corresponding to the interface and which are constructed according to said protocol according to which the destination addresses are constructed;

wherein the one or more second addresses corresponding to the interfaces for each switch in the group comprise at least one common address shared by all the switches in the group; and for at least one switch in the group, at least one first address corresponding to at least one said interface on which the switch transmits control packets according to the multicast protocol, is not shared by any other switch in the group.

16. The manufacture of claim 15 wherein in the method, at least one common interface corresponds to a logical interface of a switch outside the group.

17. The manufacture of claim 16 wherein the logical interface is a Link Aggregation Group.

18. The manufacture of claim 16 wherein in the method, the switch outside the group transmits each packet with a destination address constructed according to said protocol according to which the destination addresses are constructed on at most one interface which is a member of the logical interface such that different members of the logical interface are being used for respective different packets with the same destination address.

19. The manufacture of claim 12 wherein the multicast protocol is Sparse Mode Protocol-Independent Multicast.

20. The manufacture of claim 12 wherein the protocol according to which the destination addresses are constructed is IP, and the unicast protocol is an IP routing protocol.

* * * * *